(12) United States Patent
Keeler

(10) Patent No.: US 10,151,242 B2
(45) Date of Patent: Dec. 11, 2018

(54) OIL COOLING SYSTEM

(71) Applicant: ROLLS-ROYCE plc, London (GB)

(72) Inventor: Benjamin J Keeler, Chesterfield (GB)

(73) Assignee: ROLLS-ROYCE plc, London (GB)

(*) Notice: Subject to any disclaimer, the term of this patent is extended or adjusted under 35 U.S.C. 154(b) by 0 days.

(21) Appl. No.: 15/672,584

(22) Filed: Aug. 9, 2017

(65) Prior Publication Data
US 2018/0066582 A1  Mar. 8, 2018

(30) Foreign Application Priority Data

Sep. 8, 2016 (GB) .................................. 1615280.3

(51) Int. Cl.
*F02C 7/16* (2006.01)
*F01D 25/10* (2006.01)
(Continued)

(52) U.S. Cl.
CPC ............... *F02C 7/16* (2013.01); *F01D 25/10* (2013.01); *F02C 7/14* (2013.01); *F02C 7/18* (2013.01); *F02C 7/22* (2013.01); *F05D 2220/32* (2013.01); *F05D 2220/76* (2013.01); *F05D 2260/213* (2013.01); *F05D 2260/606* (2013.01); *F05D 2270/112* (2013.01); *F05D 2270/303* (2013.01)

(58) Field of Classification Search
CPC .... F01P 2007/146; F16H 57/04; F02M 26/25; F02M 26/26; F02M 26/39; F02C 7/16; F02C 7/14; F02C 7/18; F02C 9/52; F28D 2021/0049
USPC .................................................. 165/297, 103
See application file for complete search history.

(56) References Cited

U.S. PATENT DOCUMENTS 1,073,351 A * 9/1913 Kenely .................... F28F 27/02
                                                           165/103
1,684,118 A * 9/1928 Snell ........................ B60H 1/18
                                                         137/599.14
(Continued)

FOREIGN PATENT DOCUMENTS

GB           997260 A      7/1965

OTHER PUBLICATIONS

Jan. 24, 2018 Search Report issued in European Patent Application No. 17 18 5506.
(Continued)

*Primary Examiner* — Tho V Duong
(74) *Attorney, Agent, or Firm* — Oliff PLC

(57) ABSTRACT

An oil cooling system for an engine includes an oil input line configured to receive heated oil from a component, an oil cooler configured to cool oil and direct oil to an oil return line and a first bypass line configured to selectively bypass oil from the input line to the return line without passing through the oil cooler. The first bypass line includes a first oil pressure actuated valve urged toward a closed position, and configured to move toward an open position where a pressure differential across the valve exceeds first predetermined pressure. The first bypass line further includes a second oil pressure actuated valve urged toward an open position, and configured to move toward a closed position where pressure differential across the valve exceeds a second predetermined pressure. The second predetermined pressure is greater than first predetermined pressure, and the first and second valves are provided in series.

6 Claims, 3 Drawing Sheets

Figure 1:
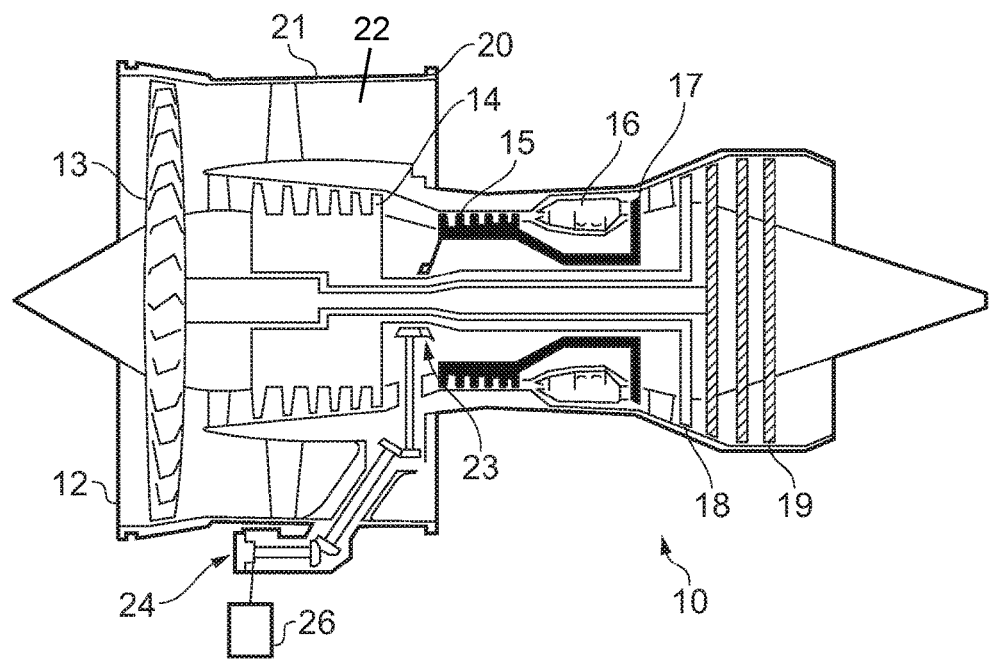

(51) Int. Cl.
　　　 F02C 7/14　　　 (2006.01)
　　　 F02C 7/18　　　 (2006.01)
　　　 F02C 7/22　　　 (2006.01)

(56) References Cited

U.S. PATENT DOCUMENTS

| | | | |
|---|---|---|---|
| 6,530,347 B2* | 3/2003 | Takahashi | F01P 7/048 |
| | | | 123/41.1 |
| 2002/0148416 A1* | 10/2002 | Cohen | F01P 7/16 |
| | | | 123/41.1 |
| 2006/0005789 A1* | 1/2006 | Miura | F01P 7/16 |
| | | | 123/41.1 |
| 2008/0029246 A1* | 2/2008 | Fratantonio | F16H 57/0412 |
| | | | 165/103 |
| 2013/0087308 A1 | 4/2013 | Logan et al. | |
| 2014/0224891 A1* | 8/2014 | Matsusaka | F01P 7/14 |
| | | | 236/34.5 |
| 2016/0003148 A1 | 1/2016 | Gameiro et al. | |
| 2016/0138533 A1* | 5/2016 | Martin | F16K 31/521 |
| | | | 123/190.1 |
| 2016/0230671 A1 | 8/2016 | Thiriet et al. | |

OTHER PUBLICATIONS

Mar. 7, 2017 Search Report issued in British Patent Application No. 1615280.3.

* cited by examiner

OIL COOLING SYSTEM

The present disclosure concerns an oil cooling system, particularly but not exclusively an oil cooling system for a component of a gas turbine engine, and a gas turbine engine comprising the oil system.

Gas turbine engines comprise oil systems to provide lubrication and cooling to various subsystems. In flowing through these components, heat is transferred to the oil, thereby raising its temperature. Oil must be kept cool to prevent coking of the oil. It is also desirable to warm the oil rapidly following engine start, since oil flows relatively slowly at low temperatures, which affects its performance.

Gas turbine engines generally comprise two separate oil systems—a main engine oil system for cooling engine bearings, and a generator oil system for cooling an engine driven electrical generator.

Consequently, in a conventional gas turbine engine, a heat exchanger such as one or more of an oil to air heat exchanger (AOHE) and an oil to fuel heat exchanger (FOHE) is provided to cool the oil. In order to prevent the oil from being overcooled, and to permit heating of the oil during startup, a bypass line is provided, which allows oil to return to the systems cooled by the oil without passing through the heat exchanger. A valve is provided to control flow of oil through the heat exchanger/bypass line. The valve is actively controlled by an actuator in accordance with a schedule, which controls the valve in accordance with a sensed oil temperature.

Though this system is effective in controlling oil temperature, the valve may be required to cycle relatively frequently in view of the narrow range of oil temperatures that are acceptable, which may lead to excessive wear and early failure. Furthermore, such rapid and frequent changes in temperature may result in thermal cycling of oil cooled components, which may lead to premature failure of these components. In view of the valve, actuator, sensor and controller, the system is relatively heavy and expensive. Individual schedules also have to be provided for each engine type, thereby increasing development costs. Finally, under low temperature operation, the valve may be slow to move due to high viscosity of the oil, leading to lag.

The present disclosure describes a gas turbine engine oil cooling system that seeks to overcome one or more of the above problems.

According to a first aspect there is provided an oil cooling system for a gas turbine engine, the system comprising:
an oil input line configured to receive heated oil from a component;
an oil cooler configured to cool oil and direct oil to an oil return line; and
a first bypass line configured to selectively bypass oil from the input line to the return line without passing through the oil cooler, wherein the first bypass line comprises:
a first oil pressure actuated valve urged toward a closed position, and configured to move toward an open position where a pressure differential across the valve exceeds a first predetermined pressure; and
a second oil pressure actuated valve urged toward an open position, and configured to move toward a closed position where a pressure differential across the valve exceeds a second predetermined pressure; wherein
the second predetermined pressure is greater than the first predetermined pressure, and the first and second valves are provided in series.

Advantageously, the system provides automatic control of the system, providing automatic temperature regulation of the oil in view of the viscosity change of the oil as temperature changes, and so the resultant change in pressure differential across the valves. Consequently, no temperature sensors or electrical or pneumatic actuators are required.

The oil cooling system may comprise an oil cooling system for a gas turbine engine generator oil system.

The oil cooler may comprise one or more of an air to oil heat exchanger, an oil to oil heat exchanger, and an oil to fuel heat exchanger.

The first and/or second pressure actuated valves may comprise spring actuated pressure relief valves (PRV). The first and/or second pressure actuated valves may be actuable to intermediate positions in dependence on the pressure differential, to provide fine control of oil flow rate.

According to a second aspect there is provided a gas turbine engine comprising an oil cooling system in accordance with the first aspect.

The oil cooling system may be configured to cool oil of an engine ancillary oil system such as an electrical generator oil system.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Figure 2:
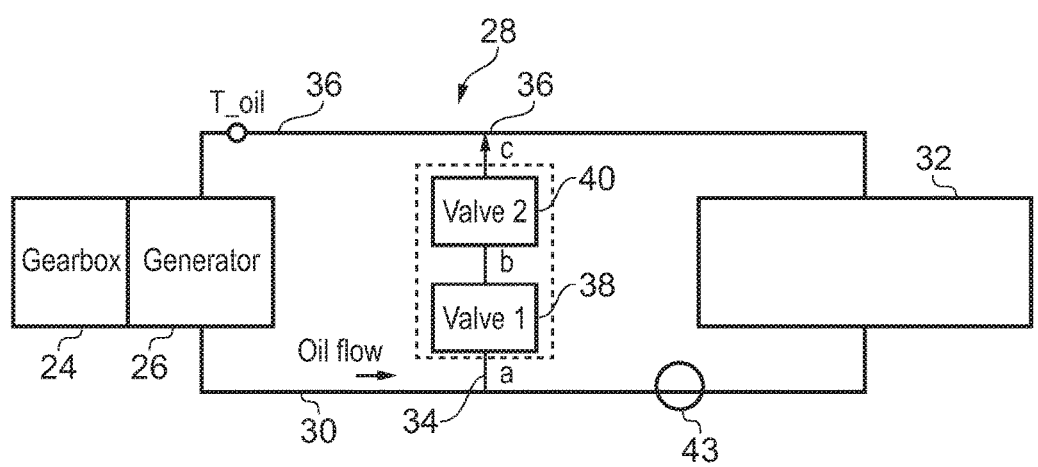
Figure 3A:
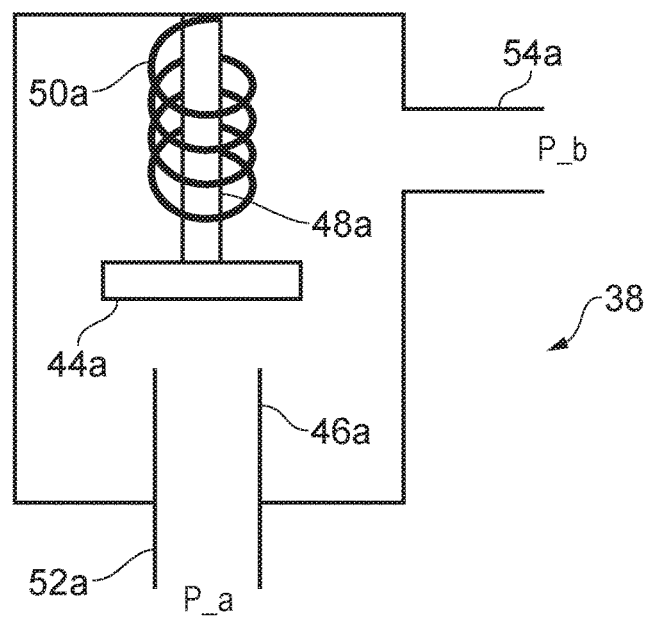
Figure 3B:
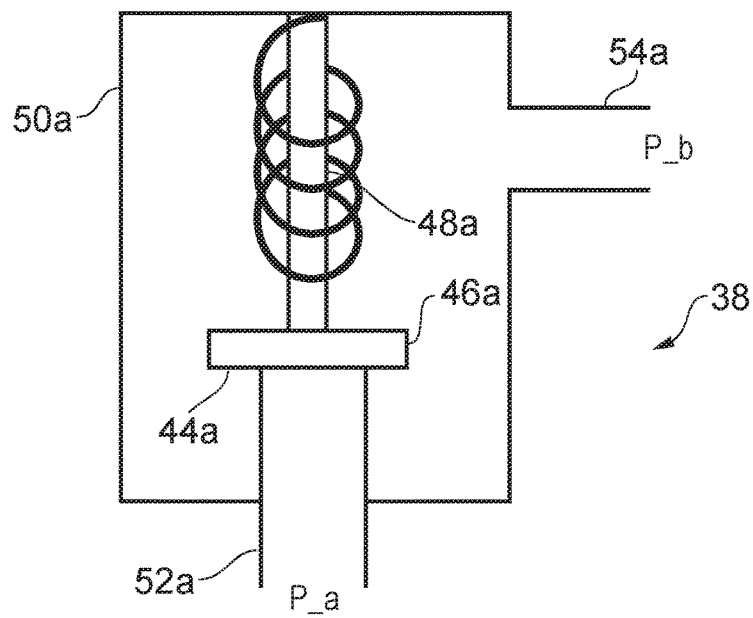
Figure 4A:
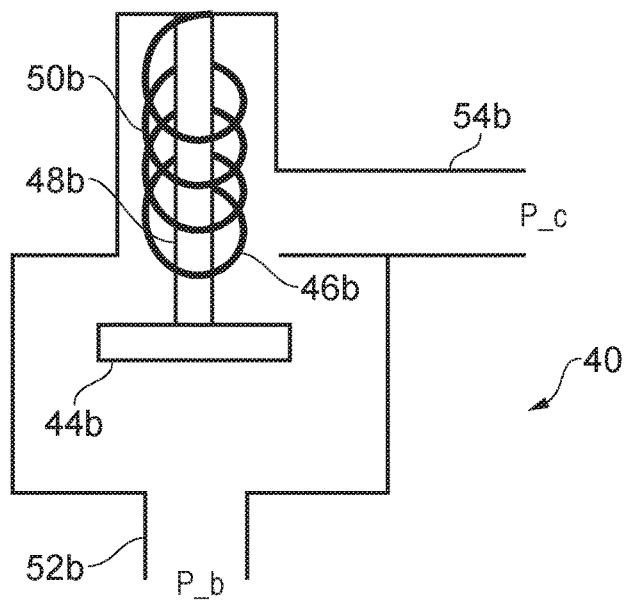
Figure 4B:
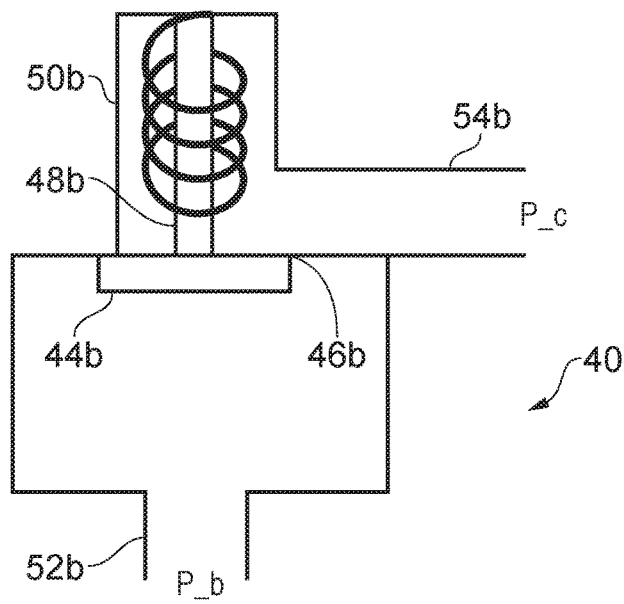

An embodiment will now be described by way of example only, with reference to the Figures, in which:

FIG. 1 is a sectional side view of a gas turbine engine;
FIG. 2 is a schematic view of an oil cooling system of an ancillary system of the gas turbine engine of FIG. 1;
FIGS. 3a-b are schematic side views of a first valve of an oil cooling system at open and closed positions respectively; and
FIGS. 4a-b are schematic side views of a second valve of an oil cooling system at open and closed positions respectively.

With reference to FIG. 1, a gas turbine engine is generally indicated at 10, having a principal and rotational axis. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shafts.

The gas turbine engine 10 comprises one or more oil cooled components. For example, the gas turbine engine 10 comprises an accessory gearbox 24 which drives accessories such as an electrical generator 26. The accessory gearbox 24 is driven by one of the main shafts interconnecting the turbines and compressors via an offtake shaft 23. The accessory gearbox requires lubrication to reduce friction, and cooling to remove heat. The generator 26 may be lubricated or unlubricated, but in any case employs oil as a coolant. In general, a main engine oil system (not shown) is also provided for lubricating high temperature components, such as shaft bearings etc, and a generator oil system is provided to cool the generator 26 only in view of the narrow margin of temperatures that can be accommodated by the generator 26.

The gas turbine engine 10 comprises a generator oil cooling system 28 configured to manage engine oil temperature, shown schematically in FIG. 2.

The system 28 comprises an oil line 30, through which oil is circulated in use. Used, heated oil which has been used to cool and lubricate and generator, 26 is transferred to the oil line 30. The system comprises a heat exchanger in the form of an oil to air heat exchanger 32, which is arranged to transfer heat from the oil within the oil line 30 to a heat transfer medium, i.e. air in this case. The air to oil heat exchanger 32 is typically a surface cooler, though could be in the form of a tube and fin heat exchanger for example.

The system 28 further comprises a bypass line 34 having an inlet in fluid communication with the oil line 30 upstream of the heat exchanger 32, and an outlet in fluid communication with an oil return line 36, downstream of the heat exchanger 32. Consequently, the bypass line 34 provides a channel that bypasses the heat exchanger 32, such that oil can return to the generator, 26 without passing through the heat exchanger 32, thereby maintaining the oil within the oil line 30 at a higher temperature. In some cases, the further bypass line 34 may be located within the heat exchanger, such that only part of the heat exchanger is bypassed.

A pump 43 is provided, which forces oil around the system 28. The pump 43 may be integral to the generator 24. The oil return line 36 is configured to return cooled oil back to the component, 26 to provide further cooling.

The system 28 comprises first and second valves 38, 40, which are provided in series within the bypass line 34. In combination, the first and second valves 38, 40 are configured to control oil flow through the bypass line 34, and thereby also control oil flow through the heat exchanger 32.

Schematic illustrations of the valve 38 in open and closed positions are shown in FIGS. 3a and 3b respectively. Similarly, valve 40 is shown in open and closed positions in FIGS. 4a and 4b respectively. Each valve 38, 40 comprises a check valve of any suitable type, such as a poppet valve. Each valve 38, 40 comprises a valve head 44a-b configured to seal against a valve seat 46a-b to thereby prevent flow where the head 44a-b and seat 46a-b are in contact. Each valve 38, 40 also comprises a valve stem 48a-b around which is provided a spring 50a-b. In each case an inlet 52 and an outlet 54 is provided, through which oil flows when the valve 38 is open.

In the case of the first valve 38, the head 44a, seat 46a and spring 50a are configured to urge the valve into the closed position, as shown in FIG. 3b, in which the head 44a and seat 46a are in contact. The head 44a faces the inlet 52, such that a first predetermined cracking pressure differential between the inlet 52a and the outlet 54a forces the head 44a against the spring 50a out of engagement with the seat 46a, to thereby open the valve 38 (as shown in FIG. 3a), and thereby permit oil to flow therethrough. As will be understood, increasing pressure will lead to further opening of the valve, thereby resulting in oil flow that increases in relation to increasing pressure.

In the case of the second valve 40, the head 44b, seat 46b and spring 50b are configured to urge the valve 40b into the open position in which the head 44b and seat 46b are spaced from one another (as shown in FIG. 4a). In this case, a second predetermined cracking pressure is required to force the head 44b against the spring 50b into engagement with the seat 46b, to thereby close the valve 38b, and thereby prevent oil from flowing therethrough. In this case, pressure greater than the second predetermined cracking pressure results in closure of the valve 38b, and therefore closure of the bypass line 34.

As will be understood, in operation, the pressure provided across the inlet and outlet 52, 54 of each valve will be related to the generator external oil system pressure drop. In turn, this pressure will be related to the viscosity of the oil, which will in turn be related to the temperature of the oil. In general, as the temperature increases, the viscosity of the oil decreases, and so the pressure between the inlet 52a-b and outlet 54a-b similarly decreases.

Since the first and second valves 38, 40 are provided in series (i.e. oil must pass through both valves in order to flow through the bypass line 34), oil will flow through the bypass line 34 only where both valves are in the open position. Since the first valve 38 is moved from the closed position to the open position where the pressure differential across the valve 38 is greater than the first predetermined cracking pressure, and the second valve 40 is moved from the open position to the closed position where the pressure differential across the valve 40 is greater than the second predetermined cracking pressure, flow through the bypass line 34 can be provided where the pressure lies within a predetermined range, provided that the second predetermined pressure is greater than the first predetermined pressure. The range of these values can be determined by providing springs having the required stiffness, or by controlling the areas of the valve head/seat.

Operation of the valves is described below in table 1:

TABLE 1

| Mode | T | ΔP | Valve 1 (38) | Valve 2 (40) | Oil cooler flow | Bypass 1 (34) flow |
|------|-----|------|--------|--------|---------|---------|
| Normal | ~20° C. | Normal | Open | Open | Partial | Partial |
| Hot | ~100° C. | Low | Closed | Open | High | Low |
| Cold | ~-40° C. | High | Open | Closed | High | Low |
| Off | ~20° C. | None | Closed | Open | None | None |

During normal running at oil temperatures of approximately 20° C., the pressure in the oil is normal, i.e. the pressure differential across the inlets and outlets of each valve 38-40 is moderate due to the moderate viscosity of the oil at these temperatures. Consequently, the pressure within the oil exceeds the first predetermined pressure required to open the first valve 38, but is lower than the second predetermined pressure necessary to close the second valve 40. Consequently, the first and second valves 38, 40 will be in the open position.

In this condition, oil will flow through the first bypass line 34, since the first and second valves 38, 40 are open. Oil will also flow through the oil cooler 32, thereby cooling the oil.

Where oil through the cooler 32 is insufficient in view of excess flow through the bypass line 34 or increase heat input to the oil from the oil cooled equipment, 26, the temperature of the oil will rise. This will result in a decrease in oil viscosity, and so a drop in pressure across the valves 38, 40. Consequently, the oil pressure will fall below the first predetermined pressure, which will result in the first valve 38 closing. Consequently, flow through the bypass line 34 will stop or reduce, and all oil will flow through the oil cooler 32, resulting in increased cooling, and so lower oil temperatures. Once the oil temperature drops back down to the nominal level, the valves 38, 40 will return to the position in the normal mode.

On the other hand, where the oil is overcooled due to excessive flow through the cooler 32, reduced heat output from the equipment, 26 or during startup at low temperatures, the oil temperature will decrease. Consequently, oil pressure will increase as viscosity increases. The pressure across the valves will therefore increase to a level greater than the first and second predetermined pressures, so the first valve 38 will be urged open, and the second valve 40 will be urged closed. Consequently, oil will pass through the oil cooler 32. At such low temperatures, the oil will not be cooled by a significant degree by the oil cooler 32, since the oil is at ambient temperature. However, flow through the oil cooler 32 will de-congeal oil within the oil cooler as heat is provided by the cooled components.

Consequently, oil temperature and flow rate split between the oil cooler 32 and bypass line 34 can be managed passively by the use of two pressure actuated valves. No temperature sensing equipment is required, nor is any controller or pneumatic, hydraulic or electrical actuation required. Consequently, an oil cooling system is provided which is low cost, reliable and lightweight.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan. The oil cooling system may be utilised for cooling further components and may comprise an oil to fuel heat exchanger.

The first bypass line may comprise a restrictor such as a throttle orifice to balance pressure between the bypass line and the oil cooler.

It will be understood that the invention is not limited to the embodiment above-described and various modifications and improvements can be made without departing from the concepts described herein. Though the invention is described in relation to a three-shaft gas turbine engine, it will be understood that the oil cooling system is applicable to any type of gas turbine engine.

Though the first valve is described as being upstream in bypass flow of the second valve, it will be understood that the valves could be provided in the opposite order, provided the valves are in series.

The invention claimed is:

1. An oil cooling system for a gas turbine engine, the system comprising:
   an oil input line configured to receive heated oil from a component;
   an oil cooler configured to cool oil and direct oil to an oil return line; and
   a first bypass line configured to selectively bypass oil from the input line to the return line without passing through the oil cooler; wherein the first bypass line comprises:
   a first oil pressure actuated valve urged toward a closed position, and configured to move toward an open position where a pressure differential across the valve exceeds a first predetermined pressure; and
   a second oil pressure actuated valve urged toward an open position, and configured to move toward a closed position where a pressure differential across the valve exceeds a second predetermined pressure; wherein
   the second predetermined pressure is greater than the first predetermined pressure, and the first and second valves are provided in series.

2. A system according to claim 1, wherein the oil cooler comprises one or more of an air to oil heat exchanger, an oil to oil heat exchanger, and an oil to fuel heat exchanger.

3. A system according to claim 1, wherein the oil cooling system comprises an oil cooling system for a gas turbine engine generator oil system.

4. A system according to claim 1, wherein the first and/or second pressure actuated valves comprise spring actuated pressure relief valves.

5. A system according to claim 1, wherein the first and/or second pressure actuated valves are actuable to intermediate positions in dependence on the pressure differential, to provide fine control of oil flow rate.

6. A gas turbine engine comprising an oil cooling system in accordance with claim 1.

* * * * *